United States Patent [19]

Lynch et al.

[11] Patent Number: 4,968,470
[45] Date of Patent: Nov. 6, 1990

[54] ASYMMETRIC PERMSELECTIVE POLYACETYLENE MEMBRANES AND PROCESS FOR THE FORMATION THEREOF

[75] Inventors: Stephen C. Lynch, Center Valley, Pa.; James K. Smith, Baton Rouge; John W. McTopy, II, LaPlace, both of La.; Pushpinder S. Puri, Macungie, Pa.

[73] Assignee: Air Products and Chemicals, Inc., Allentown, Pa.

[21] Appl. No.: 436,586

[22] Filed: Nov. 15, 1989

[51] Int. Cl.$^5$ .................... B01D 71/26; B29C 47/00
[52] U.S. Cl. .................... 264/177.14; 55/158; 264/177.18; 264/178 F; 264/DIG. 14
[58] Field of Search ............... 55/16, 68, 158; 264/41, 264/177.14, 177.15, 177.18, 177.2, 178 F, DIG. 14

[56] References Cited

U.S. PATENT DOCUMENTS

| | | | |
|---|---|---|---|
| 3,133,132 | 5/1964 | Loeb et al. | 264/49 |
| 4,230,463 | 10/1980 | Henis et al. | 55/16 |
| 4,591,440 | 5/1986 | Higashimura et al. | 55/158 X |
| 4,654,055 | 3/1987 | Malon et al. | 55/16 X |
| 4,657,564 | 4/1987 | Langsam | 55/16 |
| 4,673,418 | 6/1987 | Peinemann | 55/158 |
| 4,689,267 | 8/1987 | Takamizawa et al. | 428/376 |
| 4,714,481 | 12/1987 | Matsuura et al. | 55/16 X |
| 4,746,334 | 5/1988 | Matsui et al. | 55/16 X |
| 4,755,193 | 7/1988 | Higashimura et al. | 55/16 |
| 4,759,776 | 7/1988 | Langsam et al. | 55/16 |
| 4,851,120 | 7/1989 | Reineke et al. | 55/158 X |
| 4,859,215 | 8/1989 | Langsam et al. | 55/16 |

FOREIGN PATENT DOCUMENTS

| | | | |
|---|---|---|---|
| 1206681 | 6/1986 | Canada . | |
| 0136901 | 7/1989 | European Pat. Off. . | |
| 49-064573 | 6/1974 | Japan | 55/158 |
| 60-132605 | 7/1985 | Japan . | |
| 222111 | 11/1985 | Japan . | |
| 61-035823 | 2/1986 | Japan | 55/158 |
| 62-294419 | 12/1987 | Japan | 55/158 |
| 63-151333 | 6/1988 | Japan | 55/158 |
| 01-080419 | 3/1989 | Japan | 55/158 |
| 01-123618 | 5/1989 | Japan | 55/158 |

OTHER PUBLICATIONS

G. B. Tanny, "The Surface Tension of Polymer Solutions and Asymmetric Membrane Formation," J. Appl. Poly. Sci., vol. 18, pp. 2149-2163, (1974).

K. Darcovich, et al, "Surface Tension Considerations for Membrane Casting Systems", J. Appl. Poly. Sci., vol. 35, pp. 1769-1778 (1988).

T. D. Nguyen et al, "Effect of Nonsolvent Additives on the Pore Size and the Pore Size Distribution of Aromatic Polyamide RO Membranes," Chem. Eng. Comm., vol. 54, pp. 17-36, (1987).

*Primary Examiner*—Robert Spitzer
*Attorney, Agent, or Firm*—Mark L. Rodgers; William F. Marsh; James C. Simmons

[57] ABSTRACT

Asymmetric polyacetylene polymer membranes having both improved selectivity and improved flux are provided by a process which comprises forming a solution containing from about 1 to about 5% by weight of a polyacetylene polymer in any suitable solvent therefor, forming the solution into a thin film and quenching the film in an aqueous bath in the presence of from about 0.002 to about 0.4% by weight of the quench bath of surfactant with an HLB value of 11 to 15. Additionally, the polyacetylene polymer solution contains a swelling agent at about 1% to about 10% by weight of polyacetylene polymer solution.

21 Claims, No Drawings

ASYMMETRIC PERMSELECTIVE POLYACETYLENE MEMBRANES AND PROCESS FOR THE FORMATION THEREOF

TECHNICAL FIELD

This invention relates to asymmetric polyacetylene membranes for separating the components of a gas mixture and to processes for forming such membranes.

BACKGROUND OF THE INVENTION

Polymeric membranes have steadily evolved over the last 25 years from their infancy in the reverse osmosis and hemodialysis beginnings to recent uses in the separations of gases. Many membranes have proved themselves to be economically viable. Membrane separations initially used dense homogeneous films which exhibited good selectivity but in most instances too low flux to be of economic value. An important hurdle which was overcome in the advancement of membranes was the creation of high flux membranes with the discovery of the asymmetric membrane architecture by Loeb (e.g., U.S. Pat. No. 3,133,132).

Asymmetric membranes provide the selective properties of their dense film counterparts and at the same time provide orders of magnitude improvement in flux. The inherent advantage of asymmetric architecture is that its integral dense "skin" layer is much thinner than a typical solvent evaporated dense membrane. The asymmetric dense skin is supported by a much thicker, non-selective porous layer. The integral support layer is formed along with the dense skin from the same polymer solution in the same process step. The porous layer should be capable of safely carrying the load of the overlying dense skin during pressurized applications.

Many polymers, including the polyacetylenes, have been prepared in asymmetric form using variations of the Loeb procedure. However, as higher and higher productivity is required from an economic perspective, the target thickness of the dense skin layer must be reduced. The problems of producing asymmetric membranes with very thin dense skins are appreciable and become worse as target thicknesses are reduced.

One successful approach around this problem is the subject of the Henis patent (U.S. Pat. No. 4,230,463). where an imperfect asymmetric gas selective membrane is produced with a very thin skin layer which is then repaired by coating with a high permeability, low selectivity polymer. The selectivity and permeability properties of this type membrane are determined primarily by the repaired asymmetric membrane, but in practice is a contribution of properties of both materials. While this type membrane corrects for defects in the gas separating layer, it is a complex multi-step process which is restricted to higher selectivity, lower permeability membrane materials.

U.S. Pat. No. 4,673,418 teaches that improved polyetherimide polymers can be prepared from a solution of the polymer in a solvent having a lower boiling point than any other component in the mixture and an organic liquid swelling agent in which the polymer is not soluble and which does not react with either the polymer or the solvent. The solution is spread to form a film which develops a surface skin by evaporation and the film is then contacted with a precipitation agent to form an integral, asymmetric polyetherimide membrane. The solvents are generally described as halogenated hydrocarbons and the swelling agent as an alkyl substituted benzene, and aliphatic carboxylic acid or chlorinated hydrocarbon. While improved gas permeability is shown for the membranes disclosed in this reference, improved selectivity is not demonstrated.

Tanny, J. App. Poly. Sci., Vol. 18, pp 2149-2163 (1974) and Darcovich and Kutowy, J. App. Poly. Sci., Vol. 35, pp 1769-1778 (1988), discuss the relationship of surface tension of the solvent or solvent mixtures to the resultant asymmetric membrane. Additionally, T. D. Nguyen, et al., Chem. Eng. Comm., Vol. 54, pp 17-36 (1987) discusses the effect of nonsolvent swelling agents in the casting solutions on the average pore size and pore size distribution at the surface of polyimide membranes.

Composite membranes constitute the other primary type of membranes which currently show economic promise. Two basic types of composite membranes include, laminated composite membranes and coated composite membranes. In some cases, composites offer the opportunity to prepare membranes which cannot, because of material cost, availability or other reasons, be otherwise prepared. Both types of composite membranes suffer the same drawbacks as asymmetric membranes do, i.e., thickness of the permselective layer. Ultra-thin skin layers of laminates are very difficult to handle at production scale and are subject to damage at any of the several steps of their manufacture.

Membranes formed from substituted polyacetylenes, have been produced in most of the configurations discussed above: dense films, asymmetric membranes, laminated composites and coated composites.

The substituted polyacetylenes have received much recent interest because of their unique ability to readily form into membranes with reasonable gas selectivity and exceptional permeability (far exceeding that of the next highest competitor, silicone rubber). This unusual property has been proposed to be the result of its high excess free volume associated with the intermolecular spacing of the polymer molecules in the membrane.

Dense films made from substituted polyacetylenes are the subject in part or whole of several recent patents, such as Langsam—U.S. Pat. No. 4,657,564; Langsam, et al.—U.S. Pat. No. 4,759,776; and Higashimura, et al.— EPO No. 0136901. The polyacetylene membranes disclosed in these patents show relatively high permeability and reasonable selectivity, however the flux of any dense, homogeneous membrane is generally low because of overall thickness when compared to that which can be obtained with some of other morphologies from which the membranes can be fabricated.

The existing art of preparing composite membranes with substituted polyacetylenes shows films prepared in both flat sheet and hollow fiber form. In part, references to coated composite membranes for liquid separations (Higashimura et. al. EPO 0136901), coated composite membranes for gas separation (Minoru et. al. U.S. Pat. No. 4,689,267; Higashimura et. al. EPO No. 0136901; and laminated composite membranes (Higashimura Canada 1206681) have been found in the patent literature. As discussed above, all these composite structures suffer from the negative aspects of reliably making very thin gas selective layers.

Several methods for preparing asymmetric polyacetylene permselective membranes have been taught in the art. Details of a phase inversion membrane formation process as it relates to substituted polyacetylenes is provided in Japanese Patent No. 60-132605. All the expected variables such as polymer concentration, solvent/additive make-up, coagulant bath composition and temperature can effect the properties of the resulting membranes. While the primary benefit of the disclosed process is the very high flux resulting from drastically reduced thickness of the asymmetric skin layer, selectivity expectations are, at best, that of the dense solvent cast membrane of the same polymer. Other patents relating to preparation of asymmetric substituted polyacetylene include Higashimura-EP 0136901; and Kenichi-Japan 222111.

Japanese Patent No. 222111 shows improvement in permselectivity, at the expense of flux, with heat treatment for substituted polyacetylene membranes. The patent teaches the benefit for both dense homogeneous as well as asymmetric membranes. This information suggest improvements in selectivity can be realized with appropriate arrangement of the polymer during the membrane formation process. If this restructuring can be localized to the membrane outer surface rather than the whole dense layer, the impact on flux may also be minimized.

SUMMARY OF THE INVENTION

The present invention is a process for forming asymmetric polyacetylene polymer membranes having improved structure and unexpectedly improved permselective properties from solutions of polyacetylene polymers. The process of the invention comprises forming a solution containing from about 1 to 5%, preferably 1.5 to 3%, by weight of a polyacetylene polymer in any suitable solvent therefor, preferably tetrahydrofuran, subsequently forming the solution into a thin film and quenching the film in an aqueous bath in the presence of from about 0.002 to about 0.4% by weight of the quench bath of a surfactant with a hydrophilic-lipophilic balance (HLB) value in the range of 11-15. The surfactant can be contained in the aqueous quench or the polymer solution. Additionally, the polyacetylene polymer solution also contains from about 1 to about 10%, preferably from about 3 to 10%, by weight based on the weight of total solution, of suitable swelling agent for the polyacetylene polymer.

The process described above provides for the formation of asymmetric permselective membranes which exhibit improvements in both flux and selectivity. The present process provides a means for controlling the kinetics of membrane formation to produce membranes having a more ordered morphology and unique properties compared to membranes prepared by prior processes. In addition, the membranes of this invention have a more uniform microporous subsurface which, being more nodular; i.e., less lacelike, exhibit improved loadbearing, and hence improved durability properties. The membranes also have unexpectedly improved oxygen/nitrogen selectivities ranging from about 1.8 to about 3.5, thus exceeding the values of corresponding dense membranes by as much as 130% percent.

DETAILED DESCRIPTION OF THE INVENTION

The process of this invention provides an unexpected degree of control over the dynamic thermodynamic process for forming asymmetric permselective membranes. This additional control of the membrane formation process and its unexpected benefits is obtained through the combined use of a swelling agent in the polymer formulation and a surfactant either in the polymer solution or the coagulation bath. The unique combination of these additives influences the kinetics of the membrane formation and provides membranes in which both flux and selectivity are increased compared to corresponding dense, solvent cast membranes.

The general morphology of an asymmetric membrane produced with only the surfactant added to the system is characterized by an open, but macrovoid free support layer. Also present is a very distinct asymmetric skin which, based on selectivity measurements, is more optimally arranged on the molecular level to provide intrinsic selectivity for membranes of these polymers. The addition of a swelling agent serves the purpose of mitigating the impact of this apparent densification on the flux of the membrane, helping to keep the gas flux high.

Typically, observed performance of an asymmetric membrane produced in accordance with this invention is similar if the surfactant is formulated in the polymer solution to be cast as in Example 4 below or in the quench bath as in Example 5 because of the amphiphatic nature of the surfactants of the invention. The surfactants as described herein are composed of groups of opposing solubility tendencies, typically a lypophilic hydrocarbon chain and a hydrophilic tail with a suitable degree of separation therebetween. The amphiphatic surfactant changes the kinetics of the membrane formation process to a much greater extent than would be expected from its concentration.

The mechanism by which the kinetics of membrane formation and the morphology of the membrane produced are controlled by this invention is not entirely understood but is possibly explained in part as resulting from the lowering of the interfacial tension phenomenon. Additional benefits may occur because of structuring consistent with the orientation of lypophilic and hydrophilic moieties.

Surface tension phenomenon is known to play an important part in the formation of asymmetric membranes (Tanny, J. of App. Polymer Science 1974 and Darcovich and Kutowy. J. of App. Polymer Science 1988). Depending on the surface tension of solvents or solvent mixtures, coagulants and the polymer solution, one can obtain membranes with thin skins or no skins at all. The use of surfactant in this invention is not necessary to provide asymmetric morphology since these asymmetric membranes have already been demonstrated in the Japanese patent literature (see references cited in the background). However, membranes of the above cited art do not offer the benefits of enhanced selectivity as do the membranes of this invention.

Possibly, the role of the surfactant may be to reduce the interfacial tension between the solvent for the polymer and water to prevent or diminish the disadvantageous, vigorous, and uncontrolled, hence non-uniform, mixing which occurs when water and polyacetylene polymer solvents such as THF initially make contact. The fact that the benefits of the surfactant of the invention are obtained whether the surfactant is used in the quench bath as in Example 5 or in the polymer solution as in Example 4 supports, at least in part, the theory that one of the predominate benefits of the surfactant of the invention is the reduction of thermodynamic activity due to interfacial tension.

Another benefit of the operation of the invention might relate to the improved substructure of asymmetric permselective membranes produced by the invention. Substructures, if too open, may collapse and fail in pressure applications, resulting in reduced durability. One method of maintaining porosity while decreasing the magnitude of the forces responsible for creating this open cell substructure would be to reduce the severity of the polymer solution—coagulant system demixing during incipient membrane formation utilizing the amphiphatic nature of the surfactants of the invention.

While addition of the surfactant appears to assist in the formation of a more uniform microporous subsurface, an examination of the transport properties of the membrane reveals some unexpected results. The $O_2/N_2$ selectivity of dense membranes of the polyacetylene polymers of the invention ranges between about 1.4 to 1.6. Corresponding asymmetric membranes produced without surfactant exhibit marked increases in observed permeances, primarily due to reduction in the thickness of the dense selective skin. However, at best, such membranes exhibit selectivities characteristic of the corresponding dense films. When a surfactant is employed, either in the casting solution or quench bath, the separations improve with increases of better than 50% commonly encountered.

Surfactants have been employed before in membrane fabrication processes for purposes such as drying and rewetting aids, development of microporous morphology (pores and voids) and to adjust viscosity or regulate the presence or location of skinned surfaces. However, the bulk quantities used in the above applications would not suggest the unique results of the invention considering in particular the very low effective concentrations as illustrated in the examples below.

While the selectivity of the asymmetric membranes cast with surfactant is greatly improved over the selectivities of the corresponding dense membranes, there is some sacrifice in the flux or permeability of the membrane produced when compared to its typical asymmetric counterpart. Unexpectedly, the addition of from about 1 to about 10% by weight, and preferably from about 3–10% by weight, of a swelling agent of the polymer to the casting solution produces an alteration in the membrane morphology resulting in membranes which are more selective and have higher flux than their counterpart dense solvent cast films.

Any suitable substituted polyacetylene polymer can be used in the practice of the invention, particularly those described in U.S. Pat. Nos. 4,657,564 and 4,759,776, the disclosures of which are hereby incorporated by reference.

The polyacetylene polymers to be treated in accordance with this invention can be prepared by any suitable method such as, for example, those described in U.S. Pat. Nos. 4,657,564 and 4,759,776 incorporated herein by reference.

Preferred polymers of the invention have the formula:

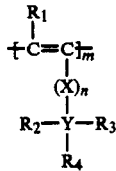

wherein $R^1$ is a linear or branched $C_1$–$C_4$ alkyl group; $R^2$ and $R^3$ are independently linear or branched $C_1$–$C_6$ alkyl groups; $R^4$ is a linear or branched $C_1$–$C_{12}$ alkyl or aryl group; X is a $C_1$–$C_3$ alkyl group or phenyl; Y is Si or Ge; m is at least 100; and n is 0 or 1. Polytrimethylsilylpropyne (PTMSP) is most preferred.

In addition to polyacetylene homopolymers, copolymers formed from other suitable monomer or polymer units along with the polyacetylene can also be used, as well as polymeric blends comprising such homo- or copolymers along with other polymer chains. Examples of monomer or polymer units which can be used to form blends or co-polymers with acetylenes include those formed from silicone rubber, sulfone, olefins, imides, amides, cellulose acetate and the like.

The concentration of the polymer in the solution from which a unique asymmetric membrane of the invention is to be cast ranges from about 1 to about 5%, and preferably from 1.5 to 3.5%, by weight of the polymer based on the weight of the total polymer solution. The composition of the polymer solutions is such that a slight increase in polymer concentration is associated with a considerable increase in viscosity. For example, an increase from a 2% polymer concentration to a 4% concentration results in a ten-fold viscosity increase.

Any suitable solvent for the substituted polyacetylene can be used to form the casting solution so long as miscibility with the swelling agent (and the surfactant, if present in the polymer solution) and the coagulating medium is maintained. Use of non-aqueous coagulating mediums significantly expands the prospective list of candidate solvents. However, in those cases an appropriate range for the HLB values which shows synergistic effect with those solvents must be determined. Examples of possible solvents include aromatic and aliphatic hydrocarbons such as hexane, cyclohexane, and toluene, halogenated hydrocarbons such as chloroform and cyclic ethers such as THF, dioxane, methyl substituted analogs and mixtures of the above. The preferred solvent is THF.

The swelling agents of this invention function in tandem with the surfactants to maintain high membrane fluxes while improvements are affected in the selectivity. Swelling agents are not solvents or preferred solvents for the polyacetylene polymers, but rather have only slight to minimal interaction with the polymer (such as expansion of volume or minimal weight gains). A primary requirement is miscibility with polymer solvent, other casting solution additives and the coagulant medium. Examples of suitable swelling agents include dimethyl acetamide (DMAC), dimethyl formamide (DMF), dimethyl sulfoxide (DMSO), trimethylphosphate, butyl cellosolve and the like and mixtures thereof. Swelling agents of the general classes of ionic organic compounds and inorganic salts are generally not suitable for this process.

While the precise role of the swelling agent in formation of the polyacetylene polymer membrane is not completely understood, it is hypothesized that the swelling agent establishes a matrix for the polymer in solution which, when set into a quench media in the presence of a surfactant, produces a better membrane morphology for selective gas separation than is achieved for the slowly-formed dense membranes or the less controlled, rapidly-formed asymmetric structure obtained from individual components of the mix. It is postulated that, when cast under kinetically controlled conditions, a well-ordered structure is captured in a dense selective skin. The incorporation of both swelling agent and surfactant provides unexpected control of the thermodynamics of membrane formation which leads to optimum polymer morphology of the dense selective skin when compared to the morphology of either the solvent evaporated dense film or the conventional asymmetric films formed with either single additive.

The swelling agent should be present in the polymer solution in concentrations of from about 1 to 10% and preferably 5 to 10% based on total solution weight.

Any suitable surfactant or mixture thereof can be used either in the polymer solution or in the quench bath provided that the surfactant is of the general classification of surfactants capable of forming an oil-in-water emulsion, is soluble in the polymer solvent and/or is reasonably dispersible if not soluble in the coagulant medium and is non-reactive with any of the system components. Preferably, the surfactant has an HLB value of from about 11 to about 15, and if present in the polymer solution is administered at a surfactant to polymer weight ratio of from about 0.025 to about 0.5, preferably from about 0.05 to about 0.25. If the surfactant is used in the coagulant bath, is should be used at weight percents of from about 0.001 to about 1.0, preferably from about 0.01 to about 0.5 based on the total weight of the coagulant fluid. A non-ionic surfactant is preferred.

The generally accepted HLB scale refers to the hydrophilic-lypophilic balance of chemical molecules and is frequently used in emulsion technology where surface active properties of various materials are of critical interest. Measurement of HLBs is empirical in basis and relates to the emulsifying and solubilizing power of surfactants. HLB values range from 1 to 20 with the following general applications linked to defined HLB ranges: water/oil emulsifier (HLB of 3.5–6.0); wetting agents (HLB 7–9); oil/water emulsifier (HLB 8–18); detergent (HLB 13–15 and solubilizing agents (HLB 15–18). (reference: Interfacial Phenomena, Davies and Rideal, Academic Press 1961).

Preferred surfactants include sucrose stearates and mixtures of sucrose stearates and sucrose distearates having and HLB of 12–14.5, a melting point of 70–78° C., a saponification value of 75–153, an hydroxyl value Of 475–595, and monoester ranging from about 52 to about 75%. Most preferred, is a mixture of sucrose distearate and sucrose stearate containing 52% of the monoester and having a melting point of 72–78° C., a saponification value of 85–145, a hydroxyl value of 475–525 and an HLB of 12. Such surfactants are prepared as described in U.S. Pat. No. 3,480,616, the disclosure of which is hereby incorporated by reference.

Another class of preferred surfactants includes non-ionic alkylarylpolyether alcohols of alkylphenylethers of polyethylene glycol. Of these, the octylphenol hydrophobe and nonylphenol hydrophobe surfactants containing from one to 30 ethylene oxide groups and prepared by reacting t-octylphenol or nonylphenol with ethylene oxide are preferred. An octylphenol ether of polyethylene glycol having 9–10 ethylene oxide groups, a specific gravity of 1.065 (25/25° C.), a viscosity of 240 cp at 25° C., and a HLB of about 13.5 is most preferred.

Examples of other suitable surfactants include polyoxyethylene monosterate, polyethylene glycol monostearate, polyoxyethylene octyl phenol, polyethylene glycol monolaurate, blends of polyoxylene fatty acid esters and polyoxyethylene fatty alcohol ethers, decaglycerin monomyristate, quarternary ammonium compounds, polyoxyethylene alkyl amines, ethoxylated ethylene diamines, and the like and mixtures thereof, provided that the surfactants have an HLB in the range of 11–15.

The components can be added to the solvent in any desired order, but the preferred method is to dissolve the polyacetylene polymer first and then add the surfactant and swelling agent.

The quench bath is preferably aqueous, but may contain minor amounts, i.e., less than about 2% by weight, of organic or inorganic non-aqueous components which are compatible with water and miscible with the solvent, mixed solvent, swelling agent, or surfactant used in the polymer formulation. Some such suitable components which may be contained in the aqueous bath include inorganic salts such as NaCl which might be used to regulate the ionic strength of the solution. The quench bath can be at any suitable temperature within the physical limits of the fluid used as a quench medium, preferably at ambient temperature or below; most preferably between about 5° and about 20° C.

The polymer solution can be formed into a film by any suitable technique. Preferably, a thin film is cast on a support and quenched while in place on the support. The support can be any suitable material but is preferably porous or microporous to facilitate membrane formation and transport properties. Glass sheets, stainless steel belts, microporous substrates such as metallic oxides, ceramics and the like can be used. Dense substrates can also be employed, and woven as well as non-woven materials known in the art are suitable casting substrates. Particular materials which can be used as support for the improved asymmetric membrane include Hollytex 3329 and Hollytex 3265 (non-woven polyesters), Viledon 2431 (non-woven polypropylene) and polyester 611 (woven polyester sail cloth). Non-woven polyester substrates are preferred.

Any suitable equipment for forming a thin film from a polymer solution can be employed to shape the membrane. The membrane can be formed in any of several shapes including flat sheet, tubular, and self supporting hollow fiber. Finished film thicknesses of from about 20 microns to about 200 microns, and preferably from about 40 to about 100 microns are generally advantageous for selective permeation and high flux, particularly for the separation of gases from mixtures thereof.

It can be expected that manufacturing variables which affect prior art asymmetric membranes such as casting knife gap, holding time before immersion in the coagulant bath, temperature and composition of the wash bath, and drying conditions can also affect properties of the improved membrane of this invention. These variables need not be optimized within the scope of this invention, and the values selected for the examples are believed to be reasonable and practical choices, however, it can be expected that further improvements may be possible by optimization of one or more of these commonly manipulated process variables.

The permeability coefficients of gaseous components for membranes used in this invention are measured by the standard relationship used in the industry as follows:

$$P = J \cdot 1/A \cdot L \cdot 1/p \cdot 10^{-10}$$

Where:
J is Flux
A is area
L is thickness
p is pressure

Additionally, the permeance (P/L), as defined by Henis and Tripodi in their paper on resistance models, J. Memb. Sci. 8, 223 (1981), of the composite structure is also measured taking into account the thickness of the ultrathin surface layer. By comparing the permeability and/or permeance values for different gaseous components, a selectivity (a) ratio for various gaseous components can be calculated.

Membranes made in accordance with this invention were tested using pure gases at applied pressures from 10–50 psig. Representative discs were cut from casting sheets and mounted into laboratory test cells. The cells were purged and pressurized before permeate gas flux was measured after allowing for a suitable equilibration period. This flux and the above relationship were then used to calculate pure gas permeance. Selectivities of selected gas pairs were calculated from the ratio of the calculated permeances.

In one embodiment of the invention, a cast film was permitted to air dry for from about 30 to 60 seconds under ambient conditions before it was quenched. During this period, the cast film developed some integrity by virtue of the evaporation of a portion of the solvent from the film before the membrane was subjected to the quench step.

After quenching, the membrane was washed for several hours with hot tap water and dried overnight at ambient conditions. The resulting asymmetric permselective membrane had a selectivity between 1.8 and 2.2 and enhanced permeation compared to that of counterpart dense solvent evaporated membrane of the same polymer. It is the unique combination of enhancing the selectivity while maintaining or increasing the permeance which distinguishes this process and these membranes from those in the prior art. This makes these membranes useful in many different gas separation operations, particularly as described in U.S. Pat. No. 4,657,564, incorporated herein by reference.

The present invention is further illustrated but is not intended to be limited by the following examples in which all parts and percentages are by weight unless otherwise indicated.

EXAMPLE 1

(Comparative)

A dense homogeneous 33 micron PTMSP membrane was prepared from the polymer 3 from Table 1 of U.S. Pat. No. 4,657,564 and toluene solution by slow controlled evaporation of the solvent. Oxygen permeance for the membrane was determined to be $0.3 \times 10^{-3}$ cm$^3$/sec-cm$^2$-cmHg. Selectivity for oxygen and nitrogen, calculated from the ratio of measured pure gas permeances, was 1.5.

EXAMPLE 2

(Comparative)

A solution of 2% of PTMSP polymer from Example 1 above and 98% THF is prepared and hand cast onto a non-woven polyester backing using a 40 mil casting knife gap. The wet film is allowed to undergo surface evaporation for 60 seconds and is then quenched in a 5° C. water bath for 15 minutes. The quenched film was washed for one hour with flowing 50° C. water and air dried. The resulting asymmetric membrane had an oxygen P/l of $2.3 \times 10^{-3}$ cm$^3$/sec-cm$^2$-cmHg with an oxygen to nitrogen selectivity of 1.4.

EXAMPLE 3

(Comparative)

An asymmetric membrane was prepared as described in Example 2 except that the polymer solution contained 2% PTMSP, 90.5% of THF, and 7.5% dimethylacetamide (DMAC) by weight based on the total component weight. The resulting membrane exhibited an increased flux as reflected in its apparent oxygen P/l of $6.8 \times 10^{-3}$ cm$^3$/sec-cm$^2$-cmHg with minimal decrease in oxygen/nitrogen selectivity to 1.3.

EXAMPLE 4

(Comparative)

An asymmetric membrane was prepared as described in Example 2 except that the polymer solution contained 2% PTMSP, 0.3% of a sucrose stearate/sucrose distearate surfactant mixture containing 52% of the monoester and having an HLB of 12 (Crodesta F110, manufactured by Croda Inc. New York, N.Y.), and 97.7% of THF. The selectivity of the membrane improved to 1.8 from the 1.4 of Example 2 with a slight decrease in the apparent P/l of oxygen to $1.6 \times 10^{-3}$ cm$^3$/sec-cm$^2$-cmHg.

EXAMPLE 5

(Comparative)

An asymmetric membrane was prepared as described in Example 2 using the polymer solution of that example except that 0.5% of the surfactant of Example 4 was incorporated in the quench bath. At this surfactant concentration a dilute emulsified mixture formed. The asymmetric membrane thus obtained showed an increase in selectivity to 1.6 with a reduction in oxygen P/l to $1.6 \times 10^{-3}$ cm$^3$/sec-cm$^2$-cmHg.

EXAMPLE 6

(Comparative)

An asymmetric membrane was prepared as in Example 5 except that the polymer solution contained 1% of, Triton X-100 surfactant, an octylphenol ether of polyethylene glycol having 9-10 oxyethylene groups and an HLB of 13.5 (Triton X-100, manufactured by the Rohm & Haas Company. Philadelphia, Penna.). The resulting membrane exhibited an increase in selectivity to 2.5, but suffered a penalty in oxygen flux to $0.5 \times 10^{-3}$ cm$^3$/sec-cm$^2$-cmHg.

EXAMPLE 7

An asymmetric membrane was prepared as in Example 3 but quenched in an aqueous bath containing about 0.2% of the surfactant described in Example 4. The resultant membrane exhibited significant increases in both selectivity and flux compared to those of the membrane of the Comparative Examples. The observed selectivity was 2.3 with an apparent oxygen P/l of $4.0 \times 10^{-3}$ cm$^3$/sec-cm$^2$-cmHg.

EXAMPLE 8

An asymmetric membrane was prepared as described in Example 7 with a higher concentration of the surfactant used in the quench bath; i.e., 0.5%. The resultant membrane exhibited a further increase in selectivity to 3.5. with P/l averages of $0.7 \times 10^{-3}$ cm$^3$/sec-cm$^2$-cmHg.

The conditions are results of the above examples are summarized in Table 1 below.

TABLE 1

| Description | Example | Details | Selectivity Improvement |
|---|---|---|---|
| "dense" film solvent evaporated PTMSP/solvent | Example #1 (comparative) | 2% PTMSP/98% toluene $(P/l)_{O2} = 0.2 \times 10^{-3}$ alpha = 1.5 calculated for l = 50 micron film | — |
| Loeb style (L) asymmetric membrane PTMSP/solvent | Example #2 (comparative) | 2% PTMSP/98% THF $(P/l)_{O2} = 2.3 \times 10^{-3}$ alpha = 1.4 | −6.7% |
| Loeb style (L) asymmetric membrane PTMSP/solvent/swelling agent | Example #3 (comparative) | 2% PTMSP/90.5% THF/7.5% DMAC $(P/l)_{O2} = 6.5 \times 10^{-3}$ alpha = 1.3 | −13% |
| Loeb style asymmetric membrane PTMSP/solvent/surfactant (F) | Example #4 (comparative) | 2% PTMSP/97.7% THF/0.3% F110 $(P/l)_{O2} = 1.9 \times 10^{-3}$ alpha = 1.8 | +20% |
| Loeb style asymmetric membrane PTMSP/solvent/surfactant (B) | Example #5 (comparative) | 2% PTMSP/98% THF/+0.5% F110 $(P/l)_{O2} = 1.7 \times 10^{-3}$ alpha = 1.6 | +6.7% |
| Loeb style asymmetric membrane PTMSP/solvent/high surfactant (F) | Example #6 (comparative) | 2% PTMSP/97% THF/1% X-100 $(P/l)_{O2} = 0.2 \times 10^{-3}$ alpha = 2.0 | +33% |
| asymmetric membrane PTMSP/solvent/swelling agent/ + surfactant (B) | Example #7 | 2% PTMSP/90.5% THF/7.5% DMAC/+0.2% F110 $(P/l)_{O2} = 4.0 \times 10^{-3}$ alpha = 2.3 | +53% |
| asymmetric membrane PTMSP/solvent/swelling agent/ + surfactant (B) | Example #8 | 2% PTMSP/90.5% THF/7.5% DMAC/+0.5% F110 $(P/l)_{O2} = 1.0 \times 10^{-3}$ alpha = 3.5 | +135% |

(B) surfactant in coagulation bath.
(F) surfactant in the casting formulation.
(L) U.S. Pat. No. 3,133,132.

Although the invention has been described in considerable detail in the foregoing, it is to be understood that such detail is solely for the purpose of illustration and that variations can be made without departing from the spirit and scope of the invention. Similar results are obtained when any of the components and/or conditions mentioned as suitable herein are substituted for its counterpart in the foregoing examples.

What is claimed is:

1. A process for the formation of an asymmetric permselective membrane which comprises forming a solution of from about 1 to about 5% by weight of a polyacetylene polymer and from about 1 to 10% of a swelling agent for the polymer in a solvent, casting the resultant solution into a thin film, quenching the film in an aqueous bath, wherein the quenching takes place in the presence of from about 0.002 to 0.4% by weight of the aqueous bath of a surfactant having a hydrophilic-lipophilic balance of from about 11-15.

2. The process of claim 1 wherein the swelling agent is present in a concentration from 5 to 10%.

3. The process of claim 2 wherein the polyacetylene polymer has the structural formula

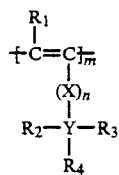

wherein $R^1$ is a linear or branched $C_1$-$C_4$ alkyl group; $R^2$ and $R^3$ are independently linear or branched $C_1$-$C_6$ alkyl groups; $R^4$ is a linear or branched $C_1$-$C_{12}$ alkyl or aryl group; X is a $C_1$-$C_3$ alkyl group or phenyl; Y is Si or Ge; m is at least 100; and n is 0 or 1.

4. The process of claim 3 wherein Y is Si.

5. The process of claim 3 wherein y is Ge.

6. The process of claim 3 wherein the polyacetylene polymer is polytrimethylsilylpropyne.

7. The process of claim 3 wherein the solvent is tetrahydrofuran.

8. The process of claim 7 wherein the concentration of the polymer is 1.5 to 3.5%.

9. The process of claim 3 wherein the solvent is allowed to evaporate from the thin film, for from about 30 to about 60 seconds before quenching.

10. The process of claim 3 wherein the surfactant is a octylphenol ether of polyethylene glycol having 9-10 oxyethylene groups and an HLB of about 13.5.

11. The process of claim 3 wherein the surfactant is a sucrose stearate/sucrose distearate surfactant mixture containing 52% of the sucrose stearate and having an HLB of about 12.

12. The process of claim 3 wherein the surfactant is contained in the aqueous quench.

13. The process of claim 12 wherein the surfactant is non-ionic.

14. The process of claim 3 wherein the surfactant is amphiphatic.

15. The process of claim 1 wherein the swelling agent is selected from the group consisting of dimethyl acetamide, dimethyl formamide, dimethyl sulfoxide, trimethylphosphate, butyl cellosolve and mixtures thereof.

16. The process of claim 1 wherein said polyacetylene polymer is a co-polymer formed from polyacetylene units along with other polymerizable monomer or polymer units.

17. The process of claim 1 wherein said polyacetylene polymer is a polymeric blend comprising piolyacetylene homo- or co-polymers along with other compatible polymer chains.

18. A process for the formation of an asymmetric permselective membrane which comprises forming a solution of about 1 to about 5% by weight of a polyacetylene polymer, from about 1 to 10% of a swelling agent for the polymer and a surfactant having a hydrophilic-lipophilic balance of from 11 to 15 at a surfactant to polymer weight ratio of from about 0.025 to about 0.5, in a solvent, casting the resultant solution into a membrane, and quenching the membrane in an aqueous bath.

19. The process of claim 18 wherein said membrane is in the form of a thin film.

20. A process in accordance with claim 18 wherein said asymmetric permselective membrane is in the form of a hollow fiber.

21. The process of claim 18 wherein the surfactant is non-ionic.

* * * * *